(12) United States Patent
Cruson

(10) Patent No.: US 6,457,426 B1
(45) Date of Patent: Oct. 1, 2002

(54) FRONT TUBE FURROW OPENER ATTACHMENT

(75) Inventor: Izaak Cruson, Pilot Butte (CA)

(73) Assignee: Dutch Blacksmith Shop Ltd., Saskatchewan (CA)

( * ) Notice: Subject to any disclaimer, the term of this patent is extended or adjusted under 35 U.S.C. 154(b) by 0 days.

(21) Appl. No.: 09/732,067

(22) Filed: Dec. 7, 2000

(51) Int. Cl.$^7$ ................................................ A01C 5/06
(52) U.S. Cl. ...................................... 111/154; 111/187
(58) Field of Search ................................ 111/123, 124, 111/125, 120, 129, 73, 152, 153, 154, 155, 156, 187, 186, 188

(56) References Cited

U.S. PATENT DOCUMENTS

| | | | |
|---|---|---|---|
| 4,446,801 A | 5/1984 | Machnee et al. | 111/86 |
| 4,520,742 A * | 6/1985 | Anderson | 111/86 |
| 5,033,398 A | 7/1991 | Froc | 111/152 |
| 5,136,954 A * | 8/1992 | Fetaz et al. | 111/123 |

OTHER PUBLICATIONS

Copies of web–pages from www.harvestechnologies.com respecting the CB12 and CB15 openers manufactured by HarvestTechnologies Ltd. of Brandon, Manitoba, Canada.

* cited by examiner

Primary Examiner—Christopher J. Novosad
(74) Attorney, Agent, or Firm—Henderson & Sturm LLP

(57) ABSTRACT

A furrow opener for attachment to a cultivator shank has a delivery tube located in front of the shank and close to the shank to facilitate trash flow around the shank. The product delivered can fall directly behind the furrow making device without negotiating an upward curve. A second delivery tube can be mounted behind the shank, and an economical manufacture of the opener is provided.

22 Claims, 4 Drawing Sheets

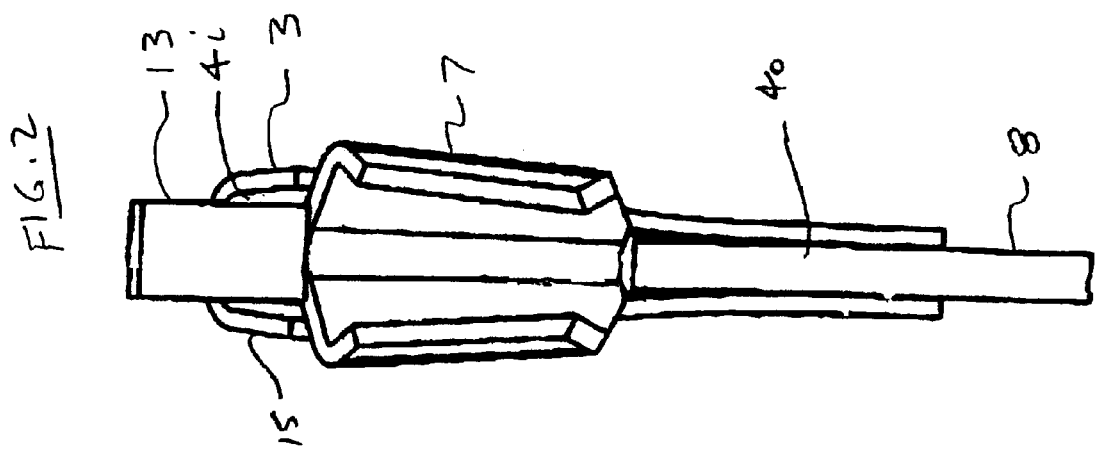
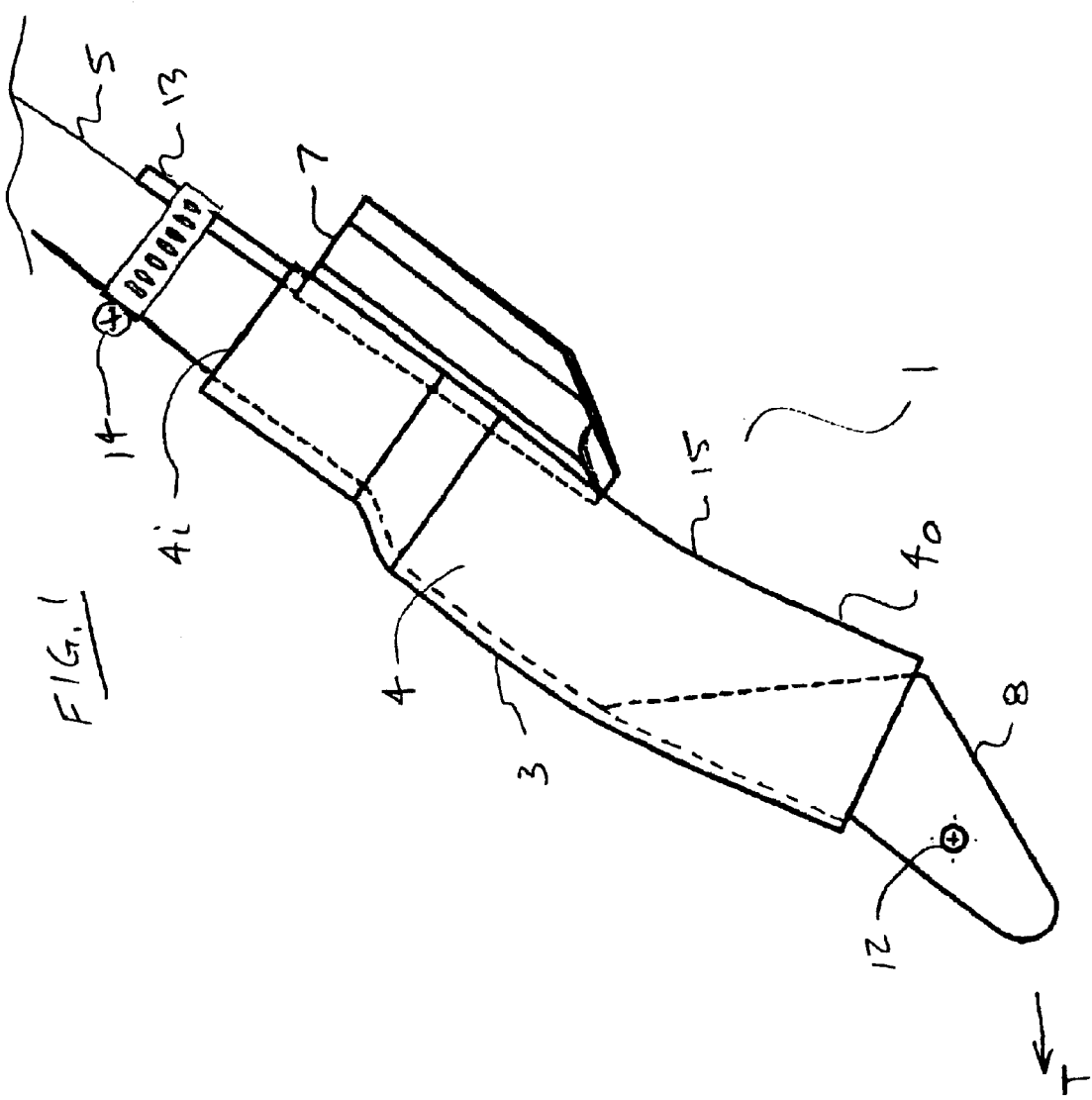

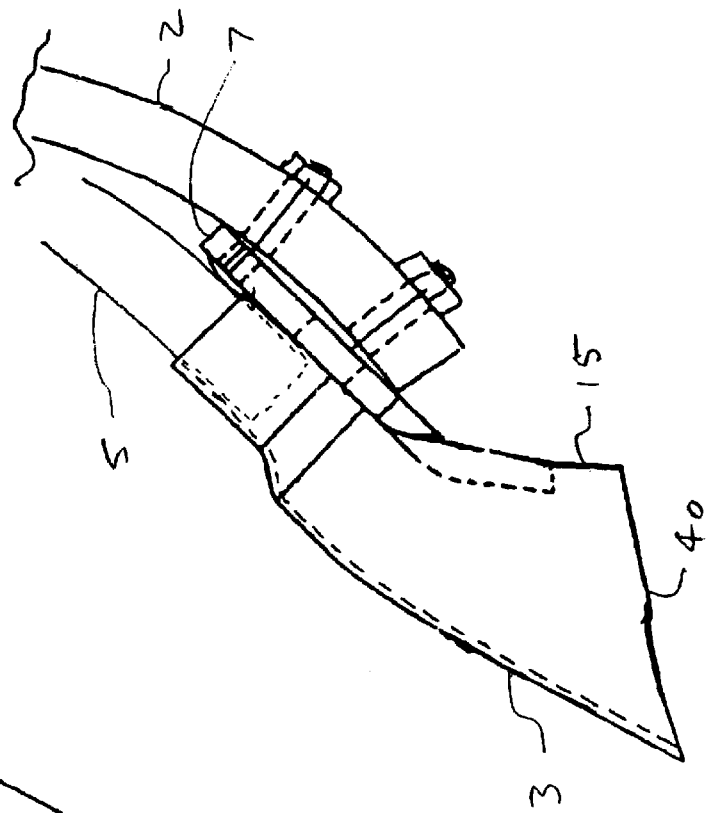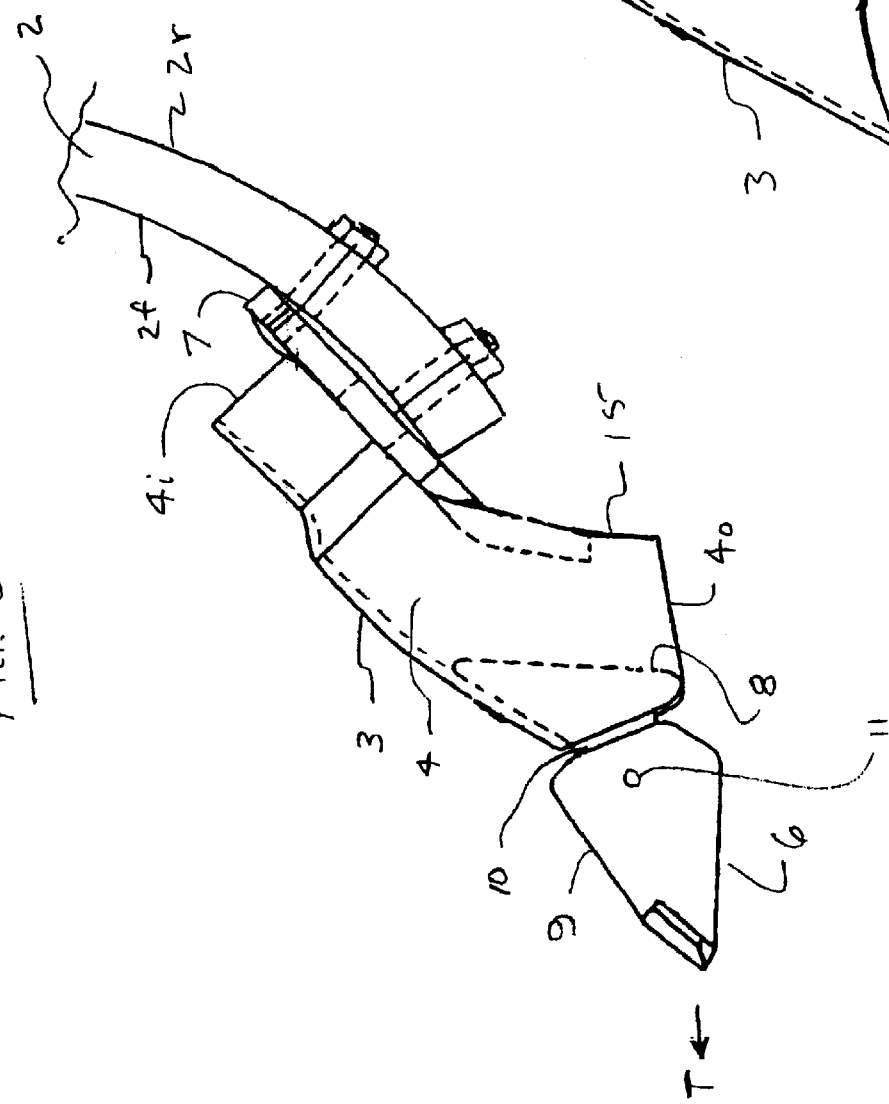

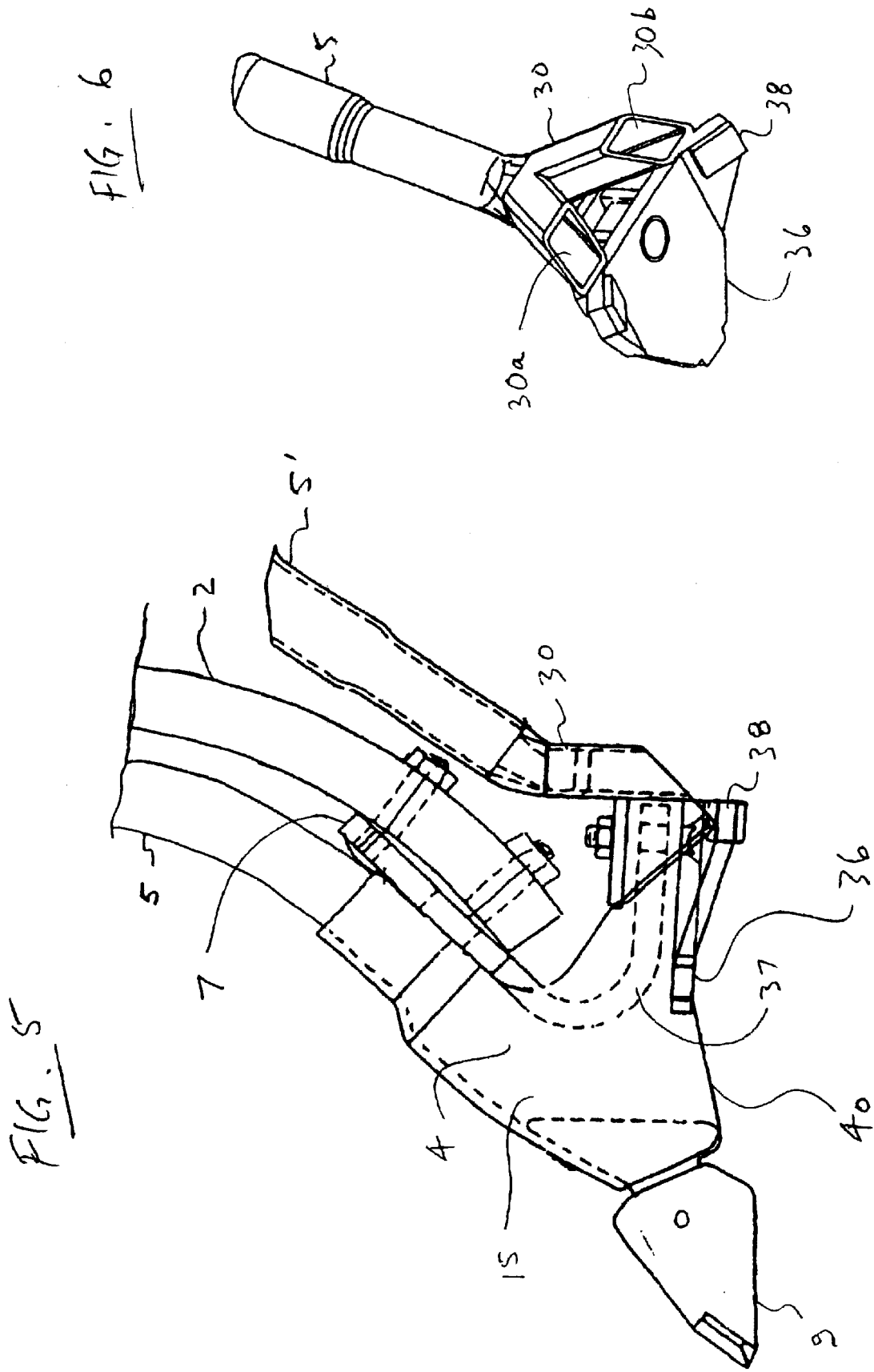

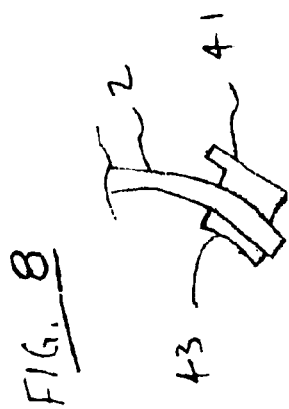
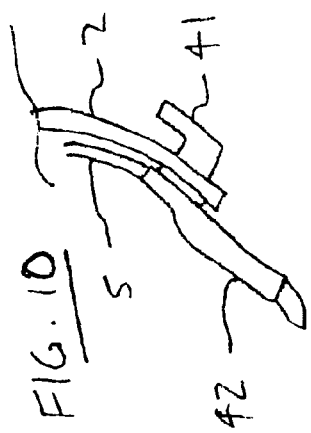
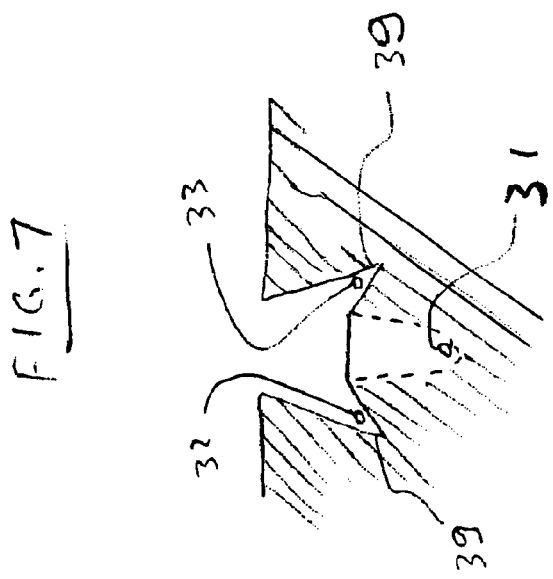

FRONT TUBE FURROW OPENER ATTACHMENT

This invention is in the field of agricultural seeding equipment and in particular devices for attachment to cultivator shanks for opening furrows and depositing seed and fertilizer therein.

BACKGROUND

Seeding apparatuses in general comprise a shank, a furrow opener at the bottom of the shank, and a delivery tube for delivering product such as seed or fertilizer to the furrow created by the furrow opener. Depending on the system used, the delivery tube can be connected directly to a hollow furrow opener, or to a boot located generally behind the furrow opener which receives the product and directs same into the furrow.

Air-seeders commonly include a seeding implement which is essentially a cultivator, with conventional cultivator shanks. Various ground engaging tools are attached to the shank to act as the furrow opener for forming a furrow.

Conventional cultivator shovels attached to the shank, which cultivate a strip of soil, are commonly used to form the furrow, with the delivery tube connected to a boot attached to the back of the shank which directs the product into the furrow. Such a furrow opening cultivator shovel attached to a shank with a boot attached to the back of the shank is illustrated in U.S. Pat. No. 5,033,398 to Froc and in U.S. Pat. No. 4,446,801 to Matchnee et al.

Alternatively, the furrow opener can be integrated with the boot into a single unit that forms the furrow and receives product from the delivery tube and directs same through a channel in the opener into the furrow, as illustrated in Canadian Patent Number 1,287,516 to the present inventor Cruson. The illustrated furrow opener is a narrow opener commonly referred to as a knife.

The deeper the furrow the more fuel is required to pull the seeder, so it is desirable that the furrow openers operate only as deep as necessary, preferably at the desired product depth, with the product deposited in the bottom of he furrow. As the furrow opener passes through the soil, soil falls back into the furrow behind it. It is thus desirable to deposit the product as close to the furrow opener as possible, especially with the narrow openers used in minimum tillage and no-till operations. In this way the product is able to fall to the bottom of the furrow before it is partially filled with soil falling in behind the furrow opener.

Canadian Patent Number 2,135,117, again to Cruson, illustrates the delivery tube curving upward under the lower end of the shank to deposit product close behind the furrow opener. This upward curve is evident in the rear tube furrow opener arrangements presently available. The upward curve under the shank can cause plugging of the product flowing through the tube, especially in damp and humid conditions and at high application rates.

Front tube furrow openers are available where the tube is attached to the furrow opener in front of the shank to avoid the upward curve and deposit product directly behind the furrow opening member as is desired. The tube is attached to these openers in a more or less vertical orientation such that the tube and shank are quite far apart. The result is poor trash clearance as straw and crop residue first contact the tube and pass around it only to then encounter the shank. The trash does not flow smoothly, as same is set in motion by the tube and flows around and behind the tube, then is set into different motion by contact with the shank. A smooth flow of is trash is inhibited and straw and residue often hangs up on the apparatus.

Double-shoot furrow openers are becoming popular as they allow fertilizer to be deposited in a band at a deeper location in the soil, with the seed generally above and to one or both sides. Seed and fertilizer are thus separated, allowing application of higher fertilizer rates without damage to the seed. Double shooting requires two delivery tubes attached to separate input openings.

In furrow openers where the tubes are mounted behind the shank, the devices become quite complex, requiring the above mentioned curve in the first channel, as well as an output opening from the second channel to the side and rearward of the output opening of the first channel. As a result these double-shoot openers extend a substantial distance behind the shank, increasing the leverage that can be exerted on the opener and cause damage.

The shank is most commonly operative to pivot backwards and up against a spring or trip when hitting a stone or other obstruction, and then move forward and down, very abruptly, when the obstruction has passed. The geometry of the system is such that the double-shoot openers extending rearward are thereby slammed into the ground, sometimes causing damage.

Double shoot furrow openers are also known where both tubes are mounted in front of the shank. These extend a substantial distance in front of the shank, increasing leverage on the opener.

One advantage of the cultivator shank implement is that it allows mounting of different furrow openers, such as the shovel or the knife, for different conditions as the farmer sees fit. Knock-on adapters are available which allow the operator to very quickly remove and replace furrow openers. With presently available systems, however, the boot attached to the back of the shank for distributing product when the shovel opener is used must be removed to allow room to attach the delivery tube to the knife opener. The changeover could be accomplished much quicker if the boot could be left attached to the shank when either opener was being used.

SUMMARY OF THE INVENTION

It is the object of the present invention to provide a furrow opener for attachment to a cultivator shank wherein a delivery tube is attached to the opener in front of the shank and in proximity to the shank to facilitate the smooth flow of crop residue.

It is a further object of the invention to provide such a furrow opener where the front and side walls are formed from a single piece of material, thus providing an economical and simple furrow opener.

It is a further object of the invention to provide such a furrow opener for double shooting where a second delivery tube is attached behind the shank.

It is a further object of the invention to provide such a furrow opener which is attachable to the shank by a knock-on adapter, and allows for quicker changing from one opener style to another.

The invention provides, in one aspect, a furrow opener for attachment to a cultivator shank, the shank having a front side facing in an operating travel direction and an opposite rear side, the furrow opener comprising a channel member defining a channel having an input opening at a top end of the channel member, and an output opening in a lower portion of the channel member, wherein the input opening is adapted for operative connection to a delivery tube for receiving seed or fertilizer; wherein a bottom end of the channel member is adapted to form a furrow and the output opening of the channel is located to deliver seed or fertilizer into the furrow; and a shank bracket attached to a rear portion of the channel member, above the output opening, and adapted for releasable attachment of the channel member to the front side of the shank such that the input opening is in proximity to the shank.

The invention provides, in a second aspect, a furrow opening apparatus comprising a cultivator shank adapted for attachment to an implement frame for movement along the ground in an operating travel direction, the shank having a front side facing in an operating travel direction and an opposite rear side; a furrow opener releasably attached to the front side of the shank, the furrow opener comprising a channel member defining a channel having an input opening at a top end of the channel member in proximity to the shank, and an output opening in a lower portion of the channel member; and wherein a bottom end of the channel member is adapted to form a furrow and the output opening of the channel is located to deliver seed or fertilizer into the furrow; and a delivery tube operatively connected to the input opening on the front side of the shank for delivering seed or fertilizer to the furrow opener.

In a third aspect the invention provides a furrow opener for attachment to a cultivator shank, the shank having a front side facing in an operating travel direction and an opposite rear side, the furrow opener comprising: a channel member defining a channel having a front input opening at a top end of the channel member, and a front output opening in a lower portion of the channel member; a rear boot defining a rear channel having a rear input opening at a top end of the rear boot member, and a rear output opening in a lower portion of the rear boot member; wherein the front and rear input openings are adapted for operative connection to front and rear delivery tubes for receiving and directing product; wherein a bottom end of the apparatus is adapted to form a furrow and at least the front output opening is located to deliver product into the furrow; and a shank bracket attached to a rear portion of the front channel member, in front of the rear boot and above the front output opening, and adapted for releasable attachment to the front side of the shank such that the front input opening is located in front of a shank location and the rear input opening is behind the shank location.

With the delivery tube connected in front of the shank, the channel can direct product to the desired output location directly behind the furrow forming member with a slight downward curve, if any, instead of an upward curve, virtually eliminating plugging. The input end is in proximity to the shank, so that the delivery tube, when attached, follows the shank and facilitates the flow of trash around the delivery tube and shank.

For double shooting, a furrow opener with one delivery tube in front of the shank and one behind is much more compact, extending no farther behind or ahead of the shank than a single shoot opener and reducing the leverage that can be exerted on the opener.

The front tube furrow opener can be attached to the shank by a knock-on adapter to facilitate switching from one opener type to another. For example, the front tube opener could be a knock-on knife with an integral channel for product in the furrow, and the alternate opener a knock-on shovel with a separate boot for depositing product attached by bolts to the rear of the shank. With the present invention, the delivery tube is connected to the knife in front of the shank allowing the boot on the back of the shank to remain in place when the openers are switched. The delivery tube is simply moved from the boot to the knife opener, and back again when the shovel is used.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a side view of an embodiment of the invention attached to the shank by a knock-on adapter;

FIG. 2 is a top view of the embodiment of FIG. 1;

FIG. 3 is a side view of an embodiment of the invention attached to the shank by bolts;

FIG. 4 is a side view of an alternate embodiment of the invention attached to the shank by bolts where the bottom end of the channel is adapted to form a furrow;

FIG. 5 is a side view of a double-shoot embodiment of the invention;

FIG. 6 is perspective view of the packing member and rear boot of the embodiment of FIG. 5;

FIG. 7 is a schematic view of the furrow made by the embodiment of FIG. 5 and the placement of product such as seed or fertilizer therein;

FIG. 8 is a schematic side view of a shank with a knock-on adapter and rear boot;

FIG. 9 is a schematic side view the shank of FIG. 8 with a shovel attached to the knock-on adapter and a delivery tube attached to the rear boot;

FIG. 10 is a schematic side view the shank of FIG. 8 with the furrow opener of FIG. 1 attached to the knock-on adapter and a delivery tube attached to furrow opener, and showing the rear boot remaining in place.

DETAILED DESCRIPTION OF THE ILLUSTRATED EMBODIMENTS

FIGS. 1–4 illustrate a furrow opener 1 for attachment to a cultivator shank 2 having a front side 2f facing in an operating travel direction T and an opposite rear side 2r. The furrow opener 1 comprises a channel member 3 defining a channel 4 having an input opening 4i at a top end of the channel member 3, and an output opening 4o in a lower portion of the channel member 3. A delivery tube 5 is inserted into the input opening 4i for delivering product such as seed or fertilizer to the furrow opener 1, and may be secured to a clamp tab 13 by a hose clamp 14, or the like.

The bottom end of the channel member 3 is adapted to form a furrow by attachment thereto of a furrow forming member 6 in front of the output opening 4o so that the output opening 4o is located to deliver product into the furrow. FIG. 4 illustrates an alternate furrow opener 1 where the bottom end of the channel member 3 is formed into a conventional pointed hoe opener with the output opening 4o located such that product falls into the furrow created.

The novel furrow opener 1 allows the product delivered to fall directly behind the furrow making device without negotiating an upward curve as required by prior art openers. Plugging of product at the opener is thereby reduced. As best seen in FIGS. 3, 4, and 5, the input opening 4i is close to the shank 2 and the delivery tube 5 follows the shank 2 up so that trash flows smoothly around essentially a single obstruction, rather than two obstructions as in the prior art where the tube 5 and shank 2 are far apart.

A shank bracket 7 is attached to a rear portion of the channel member 3, above the output opening 4o, and is adapted for releasable attachment of the channel member 3 to the front side 2f of the shank 2. The shank bracket 7 illustrated in FIGS. 1 and 2 is a knock-on bracket adapted to attach to a conventional knock-on wedge attached to the shank 2. An alternate embodiment is illustrated in FIG. 3 where the attachment to the shank 2 is by bolts, as is also well known. Other mechanisms could also serve to attach the shank bracket 7 to the shank 2.

In the furrow opener 1 of FIGS. 1–5 the front, left and right walls of the channel 3 are formed from a single piece of metal 15, and the rear wall of the channel 3 is provided by the shank bracket 7. The output opening 4o extends downward from the shank bracket 7. The furrow forming member 6 is attached to the bottom of the channel member 3 by a plate 8 inserted and attached between the left and right walls, as best seen in FIGS. 1 and 2 and extending rearward and downward from the front wall.

The one piece front and side wall construction illustrated in FIGS. 1–5 is economical to manufacture, as the channel can be stamped from a single piece of steel. However other constructions will serve as well for the purpose of forming the furrow opener 1.

The furrow forming member 6 comprises a tip 9 defining an aperture 10 in an upper portion thereof adapted to mate with the plate 8. The tip 9 is attached to the plate 8 by a pin 11 extending laterally through corresponding holes 12 in the plate 8 and tip 9. In FIGS. 1 and 2, the tip 9 is removed to show the plate 8.

FIG. 5 illustrates a double shoot addition to the furrow opener 1 of FIG. 3. A rear boot bracket 37 extends rearward from a lower portion of the furrow opener 1. The rear boot bracket 37 as illustrated is integral with the shank bracket 7 for ease of manufacture, requiring only an extended and bent length of bracket material. The single piece of steel 15 forming the channel 4 is extended rearward as well to enclose the rear boot bracket 37.

The double shoot opener of FIG. 5 is much more compact than prior art double-shoot openers, extending no farther behind or ahead of the shank 2 than a conventional single shoot opener and reducing the damage caused by excessive leverage on the opener. The double shoot opener is balanced about the shank 2, such that it does not extend excessively rearward, as in the openers where both tubes 5 are behind the shank 2, or forward as in the openers where both tubes 5 are in front of the shank 2.

The farther the opener extends from the shank 2 where it is attached, the more leverage there is exerted on it, requiring more strength and generally more material to provide that strength, and therefore more expense. The double shoot opener of FIG. 5 reduces the distance any portion of the opener is from the shank 2, and therefore reduces the the leverage that is experienced by the opener and which can damage it.

A rear boot 30 is attached to the rear boot bracket 37 and a rear delivery tube 5' is connected to the rear boot 30 rearward of the shank 2. The rear boot 30 includes a pair of conduits 30a, 30b to deposit product in second and third bands 32, 33, as illustrated in FIG. 6.

As illustrated in FIG. 7, product such as seed or fertilizer passing through the channel 4 is deposited in a first band 31 and product passing through the rear boot conduits 30a, 30b is deposited in second and third bands 32, 33 above and to each side of the first band 31.

A packing member 36 is attached to a lower side of the rear boot bracket 37, between the output opening 4o of the channel 4 and the rear boot 30, and operative to pack soil over the first band 31. The packing member 36 includes longitudinal wing portions 38 along each side thereof operative to create a groove 39 above and on each side of the first band 31, and the rear boot 30 directs product into bands 32, 33 located in each groove 39.

FIGS. 8–10 illustrate the operation of the furrow opener 1 of FIG. 1, illustrated as a knife opener 42, in a situation where the operator wishes to use a shovel opener 40 with a rear shovel boot 41 attached to the shank 2 as well as the knife opener 42. The shovel and knife openers 40, 42 are releasably attached to the shank 2 by a knock-on adapter 43. When using the knife opener 42, the delivery tube 5 is connected to the knife opener 42, with the rear shovel boot 41 left in place. The knife opener 42 can be removed and replaced on the knock-on adapter by the shovel opener 40, and the delivery tube 5 can be simply connected to the rear shovel boot 41.

Removal of the rear shovel boot 41 is not required to use the knife opener 42, as the delivery tube is in front of the shank 2, and the rear shovel boot 41 does not interfere. Changing f rom one opener to the other is thus accomplished without removing or replacing the rear shovel boot, greatly reducing the time required to make the change.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A furrow opener for attachment to a cultivator shank, the shank having a front side facing in an operating travel direction and an opposite rear side, the furrow opener comprising:

a channel member defining a channel having an input opening at a top end of the channel member, and an output opening in a lower portion of the channel member, wherein the input opening is adapted for operative connection to a delivery tube for receiving product;

a shank bracket attached to a rear portion of the channel member, above the output opening, and adapted for releasable attachment of the channel member to the front side of the shank such that the input opening is in proximity to the shank;

wherein front, left and right walls of the channel are formed from a single piece of metal, and wherein a rear wall is provided by the shank bracket;

wherein a bottom end of the channel member is adapted to form a furrow by attachment thereto of a furrow forming member in front of the output opening and the output opening of the channel extends downward from the shank bracket and is located to deliver product into the furrow; and wherein the furrow forming member is attached to the bottom of the channel member by a plate inserted and attached between the left and right walls, and extending rearward and downward from the front wall.

2. The furrow opener of claim 1 wherein the furrow forming member comprises a tip defining an aperture in an upper rear portion thereof, the aperture adapted to mate with the plate, and wherein the tip is attached to the plate by a pin extending laterally through corresponding holes in the plate and tip.

3. The furrow opener of claim 2 further comprising an attachment for a second delivery tube at a location rearward of a shank location for depositing product from the second delivery tube.

4. The furrow opener of claim 3 wherein the attachment for a second delivery tube comprises a rear boot bracket extending rearward from a lower portion of the furrow opener, and a rear boot attached to the rear boot bracket and adapted to receive a delivery tube at a rear boot location rearward of the shank location for receiving and directing product.

5. The furrow opener of claim 4 wherein product passing through the channel is deposited in a first band and wherein product passing through the rear boot is deposited in a second band above and to one side of the first band.

6. The furrow opener of claim 5 wherein product passing through the rear boot is deposited in second and third bands above and to each side of the first band.

7. The furrow opener of claim 6 further comprising a packing member attached to a lower side of the rear boot bracket, between the output opening of the channel and the rear boot, and operative to pack soil over the first band.

8. The furrow opener of claim 7 wherein the packing member includes longitudinal wing portions along each side thereof operative to create a groove above and on each side of the first band, and wherein the boot directs product to each groove.

9. The furrow opener of claim 1 further comprising a rear boot bracket extending rearward from a bottom end of the shank bracket, and a rear boot attached to the rear boot bracket and adapted to receive a delivery tube at a rear boot location rearward of a shank location for receiving and directing product.

10. The furrow opener of claim 9 wherein the rear boot bracket and shank bracket are integral being formed from a single bent piece of material.

11. The furrow opener of claim 1 wherein the shank bracket is adapted to attach to the shank by a knock-on adapter.

12. The furrow opener of claim 1 wherein the shank bracket is adapted to attach to the shank by bolts.

13. A furrow opener for attachment to a cultivator shank, the shank having a front side facing in an operating travel direction and an opposite rear side, the furrow opener comprising:

a front channel member defining a front channel having a front input opening at a top end of the front channel member, and a front output opening in a lower portion of the front channel member;

a rear boot bracket extending rearward from a bottom end of the front channel member adjacent to a bottom end of a shank location;

a rear boot attached to a rear end of the rear boot bracket and defining a rear channel having a rear input opening at a top end of the rear boot, and a rear output opening in a lower portion of the rear boot;

wherein the front and rear input openings are adapted for operative connection to front and rear delivery tubes for receiving and directing product;

wherein a bottom end of the furrow opener is adapted to form a furrow and at least the front output opening is located to deliver product into the furrow; and wherein a rear portion of the front channel member is adapted for releasable attachment to the front side of the shank such that the front input opening is located in front of the shank location and the rear input opening is located behind the shank location.

14. The furrow opener of claim 13 further comprising a rear furrow forming member operative to form a second furrow behind the front output opening, and wherein the rear boot is adapted to direct product into the second furrow.

15. The furrow opener of claim 14 wherein product passing through the front channel is deposited in a first band and wherein product passing through the rear boot is deposited in a second band above and to one side of the first band.

16. The furrow opener of claim 14 wherein product passing through the rear boot is deposited in second and third bands above and to each side of the first band.

17. The furrow opener of claim 16 further comprising a packing member attached to a lower side of the rear boot bracket, between the front output opening and the rear boot, and operative to pack soil over the first band.

18. The furrow opener of claim 17 wherein the packing member includes longitudinal wing portions along each side thereof operative to create a groove above and on each side of the first band, and wherein the rear boot directs product to each groove.

19. The furrow opener of claim 13 further comprising a shank bracket attached to a rear portion of the front channel member and adapted for releasable attachment on the front side of the shank.

20. The furrow opener of claim 19 wherein the rear boot bracket and shank bracket are integral being formed from a single bent piece of material.

21. A furrow opening apparatus comprising:

a cultivator shank adapted for attachment to an implement frame for movement along the ground in an operating travel direction, the shank having a front side facing in the operating travel direction and an opposite rear side;

a front channel member defining a front channel having a front input opening at a top end of the front channel member, and a front output opening in a lower portion of the front channel member;

a rear boot bracket extending rearward from a bottom end of the front channel member;

a rear boot attached to a rear end of the rear boot bracket and defining a rear channel having a rear input opening at a top end of the rear boot, and a rear output opening in a lower portion of the rear boot;

front and rear delivery tubes connected to the front and rear input openings for supplying product to the furrow opener;

wherein a bottom end of the furrow opener is adapted to form a furrow and at least the front output opening is located to deliver product into the furrow; and wherein a rear portion of the front channel member is attached to the front side of the shank such that the front channel member and front input opening are located in front of the shank and the rear boot and rear input opening are located behind the shank.

22. The apparatus of claim 21 wherein front, left and right walls of the front channel member are formed from a single piece of metal, and wherein a rear wall is provided by a shank bracket releasably attached to the front side of the shank.

* * * * *